(12) United States Patent
Lantry et al.

(10) Patent No.: US 7,721,029 B2
(45) Date of Patent: May 18, 2010

(54) DATA RESTORATION IN ARCHIVABLE MOBILE RANDOM ACCESS STORAGE DEVICES

(75) Inventors: Mark Lorin Lantry, Fort Collins, CO (US); Matthew Thomas Starr, Lafyette, CO (US)

(73) Assignee: Spectra Logic Corporation, Boulder, CO (US)

( * ) Notice: Subject to any disclaimer, the term of this patent is extended or adjusted under 35 U.S.C. 154(b) by 948 days.

(21) Appl. No.: 11/264,920

(22) Filed: Nov. 2, 2005

(65) Prior Publication Data
US 2007/0130406 A1 Jun. 7, 2007

(51) Int. Cl.
G06F 3/00 (2006.01)
G06F 13/12 (2006.01)
G06F 13/38 (2006.01)

(52) U.S. Cl. .......................................... 710/74; 710/18
(58) Field of Classification Search .................... 710/18, 710/74
See application file for complete search history.

(56) References Cited

U.S. PATENT DOCUMENTS

| | | | | |
|---|---|---|---|---|
| 4,180,724 A | * | 12/1979 | Councilman et al. | 377/16 |
| 5,479,581 A | * | 12/1995 | Kleinschnitz | 700/247 |
| 5,729,464 A | * | 3/1998 | Dimitri | 700/215 |
| 5,818,723 A | * | 10/1998 | Dimitri | 700/214 |
| 6,230,082 B1 | * | 5/2001 | Harada et al. | 701/1 |
| 6,460,055 B1 | * | 10/2002 | Midgley et al. | 707/204 |
| 6,628,466 B2 | | 9/2003 | Alex | |
| 6,970,318 B2 | * | 11/2005 | Goodman et al. | 360/69 |
| 2001/0044877 A1 | * | 11/2001 | Kanazawa et al. | 711/111 |
| 2002/0080508 A1 | | 6/2002 | Alex | |
| 2003/0101155 A1 | * | 5/2003 | Gokhale et al. | 707/1 |
| 2004/0105187 A1 | | 6/2004 | Woodruff et al. | |

(Continued)

FOREIGN PATENT DOCUMENTS

WO WO 2005/010661 A2 2/2005

(Continued)

OTHER PUBLICATIONS

IBM Technical Disclosure Bulletin, vol. 35, No. 8, Aug. 1993, "Method to Enhance Disk Reliability in Optical Libraries".*

(Continued)

*Primary Examiner*—Niketa I Patel
*Assistant Examiner*—Farley J Abad
(74) *Attorney, Agent, or Firm*—Kenneth Altshuler

(57) ABSTRACT

Described are a method and apparatus for preserving data integrity which can be practiced in a data storage library that receives data from a host computer. The data storage library includes a docking station that stores data to and from an operatively linked mobile random access storage device. Once the data is stored on the mobile random access storage device, the elapsed time is accounted for. The mobile random access storage device is adapted to be unlinked from the docking station, such as for purposes of archiving the mobile random access storage device. A user can be notified when the elapsed time has reached a time limit. Upon indicating that the data on mobile random access storage device should be restored, the mobile random access storage device can be re-linked with the docking station for data restoration, thus, starting a new elapsed time.

25 Claims, 10 Drawing Sheets

U.S. PATENT DOCUMENTS

| | | |
|---|---|---|
| 2004/0193798 A1 | 9/2004 | Kuwamura |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0022065 A1 | 1/2005 | Dixon et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0076070 A1* | 4/2005 | Mikami .............. 707/204 |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0207049 A1* | 9/2005 | Ikeda et al. .............. 360/31 |
| 2005/0219964 A1 | 10/2005 | Pollard et al. |
| 2005/0246484 A1 | 11/2005 | Lantry et al. |
| 2005/0254456 A1* | 11/2005 | Sakai et al. .............. 370/328 |
| 2005/0267627 A1 | 12/2005 | Lantry et al. |
| 2007/0050569 A1* | 3/2007 | Haustein et al. .......... 711/154 |

FOREIGN PATENT DOCUMENTS

| | | |
|---|---|---|
| WO | PCT/US2005/045168 | 12/2005 |
| WO | PCT/US2005/046447 | 12/2005 |

OTHER PUBLICATIONS

U.S. Appl. No. 10/950,613, Starr et al.
U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.

* cited by examiner

DATA RESTORATION IN ARCHIVABLE MOBILE RANDOM ACCESS STORAGE DEVICES

CROSS-REFERENCE TO RELATED APPLICATIONS

None.

FIELD OF THE INVENTION

The present invention relates generally to data restoration in archivable mobile random access storage devices.

BACKGROUND

Tape libraries have historically been the primary storage devices for amassed digital data. This has been due in part because of the tape libraries' ability to store considerably large amounts of data in a cost-efficient and data-stable manner. Other types of storage systems containing alternative media such as disc drives, optical storage systems and flash memory, however, are gaining momentum as a consequence of advancements in random access storage technology and relative cost improvements. These alternative storage systems take advantage of random access memory storage functionality which can dramatically speed up data transfer between a host and storage system.

Nonetheless, the benefit of random access memory storage has a cost in terms of reliability of data integrity. For example, disc drives are subject to data loss over time due in part to thermal degradation, an issue of growing concern given the aggressive a real density curve the disc drive industry is tracking. In order to increase a real density, data bit sizes are typically reduced, creating a greater probability for instabilities in the data bits which translates to data loss. Hence, in time, all digital data stored on magnetic media will vanish due to 'self erasure' of the data bits.

The disc drive industry has proposed some solutions to this problem by improving the media stability with complex magnetic alloys and constant data refresh during times in which the disc drives are not storing data on the media. However, in applications in which disc drives are not supplied with frequent or constant power, such as to archive a disc drive for later use, data loss is inevitable.

In an effort to improve data robustness in mobile random access storage devices, both methods and apparatus are described herein. It is to innovations related to this subject matter that the claimed invention is generally directed.

SUMMARY OF THE INVENTION

The present invention relates generally to data restoration in archivable mobile random access storage devices and overcomes the disadvantages and limitations of the prior art by providing a method and apparatus for restoring data after reaching a time limit from when data is stored on the mobile random access storage device.

Embodiment of the present invention can therefore comprise a method for preserving data integrity comprising: receiving data from a host computer; storing the data on a mobile random access storage device when the mobile random access storage device is operatively linked with a first docking station wherein a first data storage library comprises the first docking station; accounting for a first elapsed time from when the data was stored; unlinking the mobile random access storage device from the docking station; indicating when the first elapsed time reaches a time limit; linking the mobile random access storage device with either the first or a second docking station after the first elapsed time reaches the time limit; restoring the data after the first elapsed time exceeds the time limit; and accounting for a second elapsed time from when the data was restored.

Another embodiment of the present invention can therefore comprise a data storage library comprising: at least one mobile random access storage device comprising an identifier adapted to identify the mobile random access storage device; at least one docking station adapted to receive data from a host computer for storage on the at least one mobile random access storage device when operatively linked with the at least one mobile random access storage device; a time accounting algorithm implemented on a programmable processor adapted to monitor elapsed time from when the data was stored on the at least one mobile random access storage device and wherein the time accounting algorithm is capable of indicating when the elapsed time has exceeded a time limit from when the data was stored.

Yet another embodiment of the present invention can therefore comprise a system for preserving data integrity comprising: means for receiving data from a host computer; means for storing the data on a mobile random access storage device when the mobile random access storage device is operatively linked with a first docking station wherein a first data storage library comprises the first docking station; means for accounting for first elapsed time from when the data was stored; means for unlinking the mobile random access storage device from the docking station; means for indicating when the first elapsed time reaches a time limit; means for linking the mobile random access storage device with either the first or a second docking station after the first elapsed time reaches the time limit; means for restoring the data after the first elapsed time exceeds the time limit; and means for accounting for second elapsed time from when the data was restored.

Yet another embodiment of the present invention can therefore comprise a method for restoring data stored on a mobile random access storage device prior to loss of data integrity at a predetermined time comprising the steps of: accounting to determine if the data stored on the device has been stored for the predetermined time; restoring the data if the data has been stored on the device for the predetermined time.

DETAILED DESCRIPTION

Figure 1:
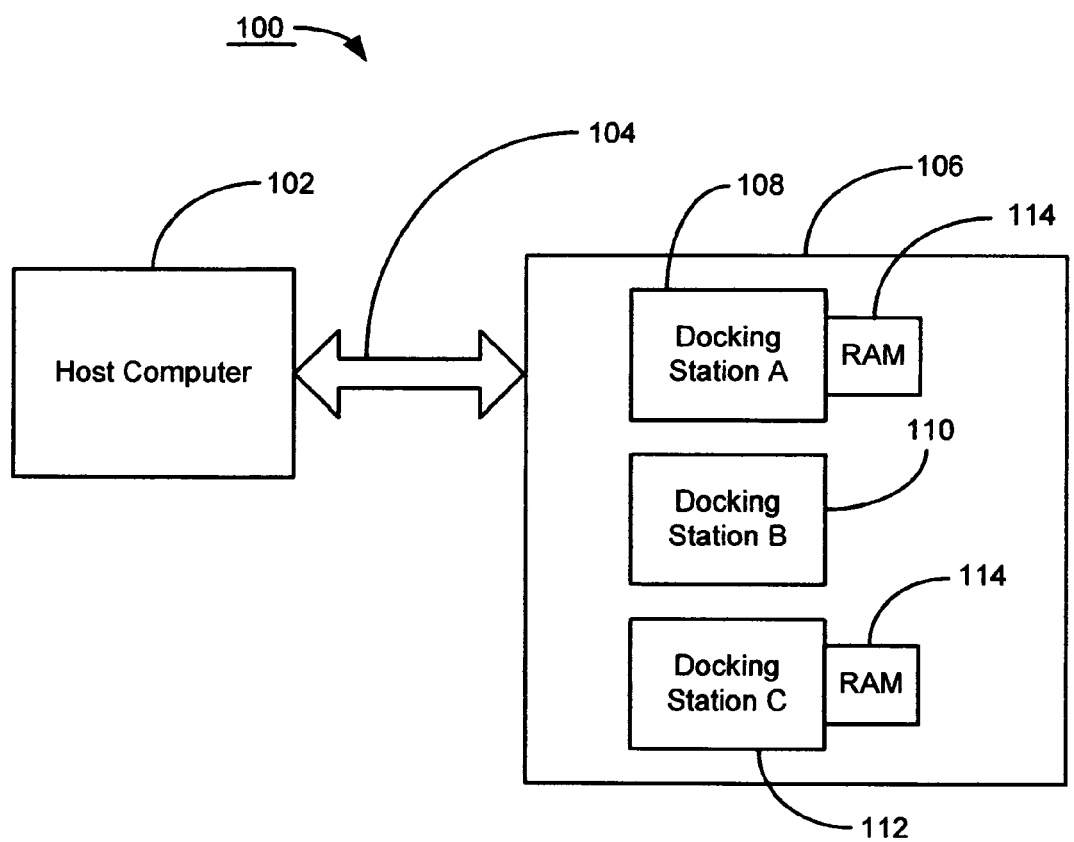
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a storage library 106. A consumer of data is an entity, or entities, that is capable of "taking in" data, for example a host computer 102 is a consumer when receiving data and a storage system 106 is a consumer when receiving data. As one skilled in the art will appreciate, in addition to "taking in" data, a consumer of data is also generally capable of manipulating and/or transmitting data. The host computer 102 is one embodiment of a consumer of data, such as a personal computer, a main frame computer, a server, or any other computer system linked to the storage library 106. Other consumers of data can be another library system or a streaming output device, such as a video server, to name two more examples. The communication path 104, at a minimum, needs only to facilitate communication between the host computer 102 and the storage library 106. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path can be in the form of a wire line pathway, wireless, or a combination thereof. The storage library 106 is capable of retrieving/receiving and storing data from the host 102 by means of at least one docking station. In the illustrative embodiment of FIG. 1, three are shown, docking station A 108, docking station B 110 and docking station C 112. Docking stations A 108 and C 112 are each operatively linked with a mobile Random Access Memory (RAM) storage device 114, wherein the mobile RAM storage devices 114 are adapted to store data received from the host computer 102 via the docking stations, such as docking station A 108 for example. A mobile RAM storage device 114 is capable of storing random data that is not constrained by a linear format, such as tape. In one embodiment, a mobile RAM storage device 114 can be inserted in the docking station, such as docking station A 108; however the mobile RAM storage device 114 does not have to be physically inserted or connected to a docking station, but needs only to be linked to a docking station to store data received via the docking station. Docking station B 110 is not linked with a mobile RAM storage device 114, and hence is unable to store data received beyond any storage capacity docking station B 110 may comprise, such as Dynamic RAM for example. For purposes of simplicity, communication with the storage library 106 is considered to include the storage library 106 and/or communication directly with components comprised by the storage library 106. A docking station, such as docking station A 108, is an apparatus that is capable of coupling or linking with a mobile RAM storage device, such as mobile RAM storage device 114, for storage operations. Examples of a docking station include a USB port capable of receiving a USB device, a disc drive or disc drive magazine receptacle, serial port connection(s), parallel port connection(s), or any apparatus capable of transmitting and receiving data to and from a storage device via wire line or wireless, to name several examples.

Figure 2:
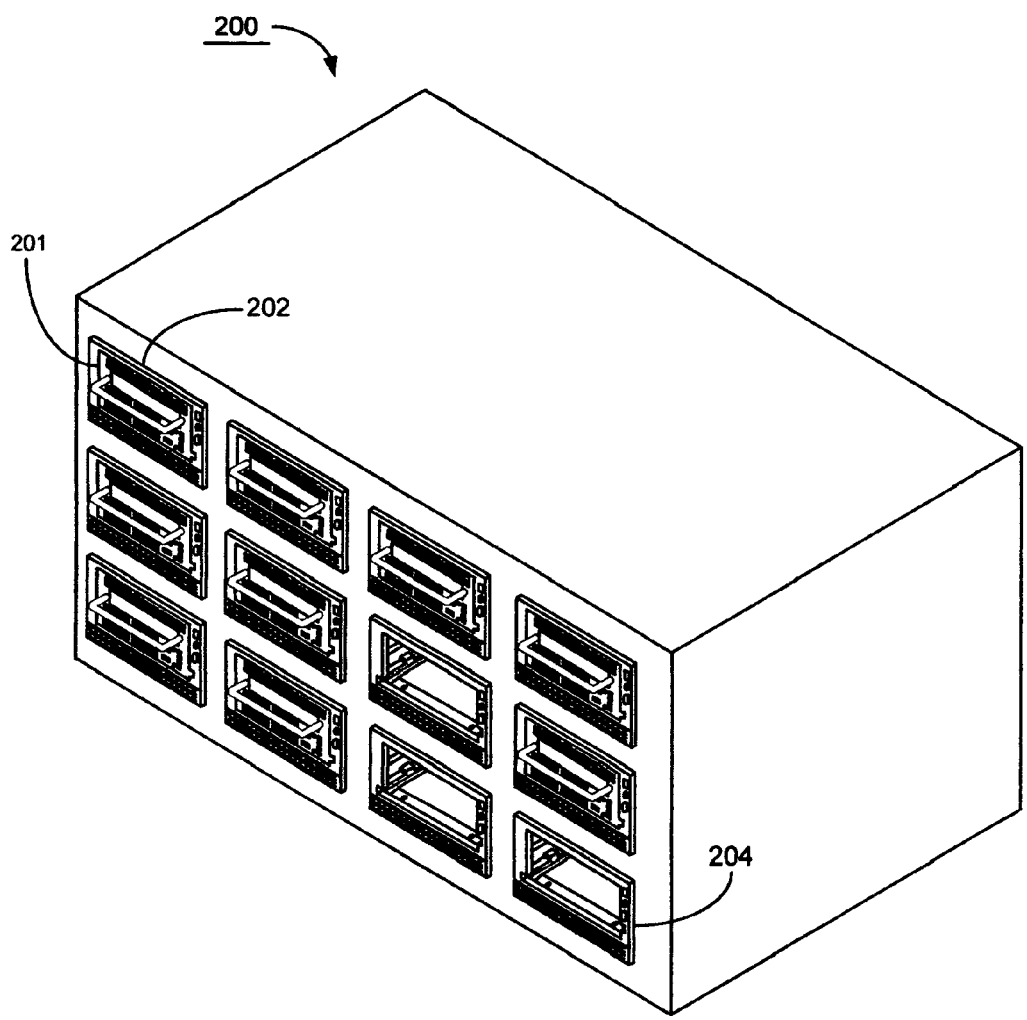
FIG. 2 shows an example of a storage system wherein the present invention can be practiced in accordance with some embodiments of the present invention.

FIG. 2 shows an example of a storage library 106 in accordance with one embodiment of present invention. Here, an RXT Bank of drives disc drive magazine library 200 from Spectra Logic Corp. of Boulder, Colo. is shown comprising a plurality of mobile random access memory devices (in this example disc drive magazines 201) and docking stations 202 operatively linked to one another to function as the RXT library 200. The disc drive magazines 201 are adapted for mobility, and can be removed from or inserted into a docking station 202, as illustrated by a vacant docking station 204 capable of receiving a disc drive magazine 201, for example. The RXT library 200 is capable of communicating with a host, such as the host 102, via, for example, a sequential storage protocol, such as a tape library protocol used for streaming data to store on tape medium.

Figure 3:
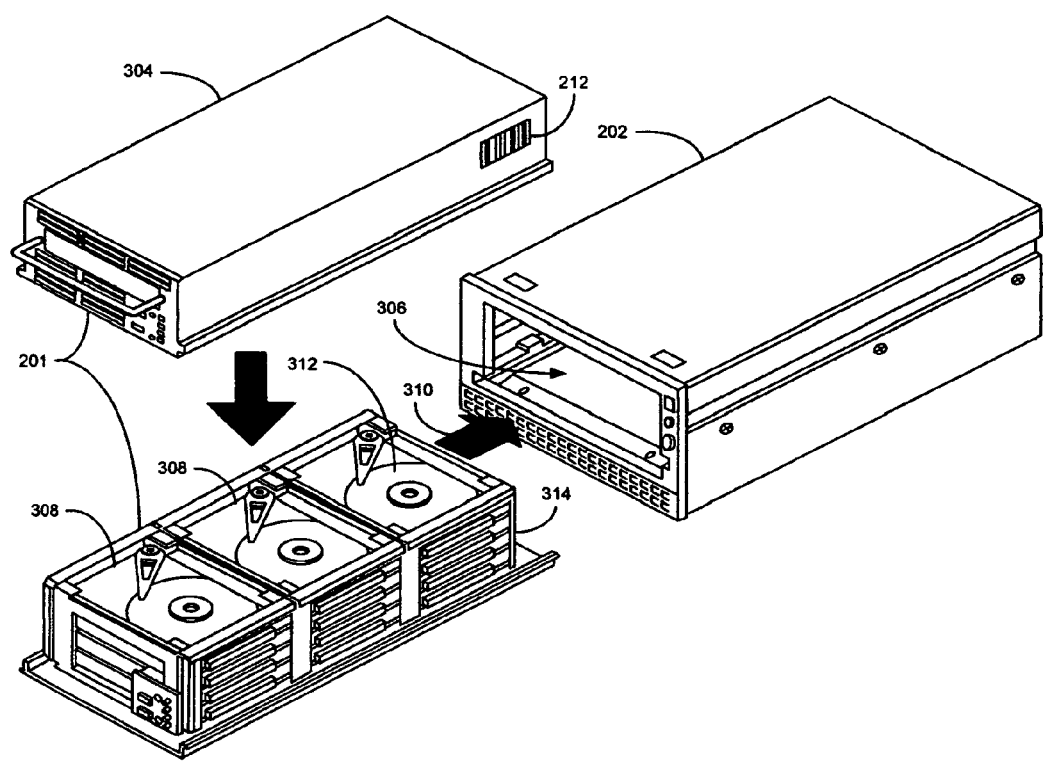
FIG. 3 shows an illustration of an embodiment of an RXT disc drive magazine and docking station wherein the present invention can be practiced in accordance with some embodiments of the present invention.

FIG. 3 shows a more detailed illustration of an embodiment of an RXT disc drive magazine 201 and docking station 202. Here, a plurality of disc drives 308 are shown substantially contained by an enclosure 304 generally comprising the mobile disc drive magazine 201. Disposed on the enclosure is an optional bar code identifier 212 adapted to identify the mobile RAM storage device 201, if, for example, the storage device 201 is archived in a location remote to the storage library 200. A conventional magnetic disc drive 308 is only one embodiment of a RAM storage element comprised by a mobile RAM storage device 114 according to the present invention, which, in further embodiments, can include flash memory and optical memory, just to name a few (see below). The mobile disc drive magazine 201 is adapted to be received by an opening 306 in the docking station 202 as shown by the arrow 310. While the docking station 202 is shown as one of a number of stations in the library 200, one of ordinary skill will appreciate that the docking station 202, by itself, can be used as a stand-alone storage library. The engaging surface 314 of the mobile disc drive magazine 201 can be adapted with electrical contacts (not shown) to contact with complementary electrical contacts (not shown) on the engaging surface (not shown) of the docking station 202. In this illustrative embodiment, when contact is made, the RXT disc drive magazine 201 is considered operatively linked with the docking station 202 and the transmission of data can occur between the docking station 202 and the mobile disc drive magazine 201. Furthermore, power can optionally be provided to the mobile disc drive magazine 201 by the docking station 202. Power and data transmission provide a cooperatively linked state between the mobile disc drive magazine 201 and the docking station 202. The docking station 202 is shown to be capable of being electrically connected with a host computer, such as the host computer 102, or other storage device/s, such as the RXT storage library 200 for example, by a coupling means, such as wires, plugs-in, wireless transmission (e.g., IR, RF), or any combination or equivalence thereof. By linking the docking station 202 with the storage library 200, a connected disc drive magazine 201 is effectively in a cooperatively linked state with the storage library 200.

While the claimed invention has utility in any number of different applications, the RXT Bank of drives disc drive magazine library 200 has been provided to illustrate a suitable environment in which the claimed invention can be practiced. Here, the docking station 202 is adapted to receive data, such as the data received 104 from a host computer 102 shown in FIG. 1, for storage on the disc drive magazine 201 when operatively linked with the disc drive magazine 201. Other mobile RAM storage devices can include but are not limited by a Compact Disc Read Only Memory (CDROM) for use with a Compact Disc (CD) or other optical storage media, magneto optical systems, disc drive, disc drive magazine comprising multiple disc drives, flash memory device (such as a compact flash), floppy disc drive system and RAM semiconductor memory (i.e., an SDRAM, for example).

Figure 4:
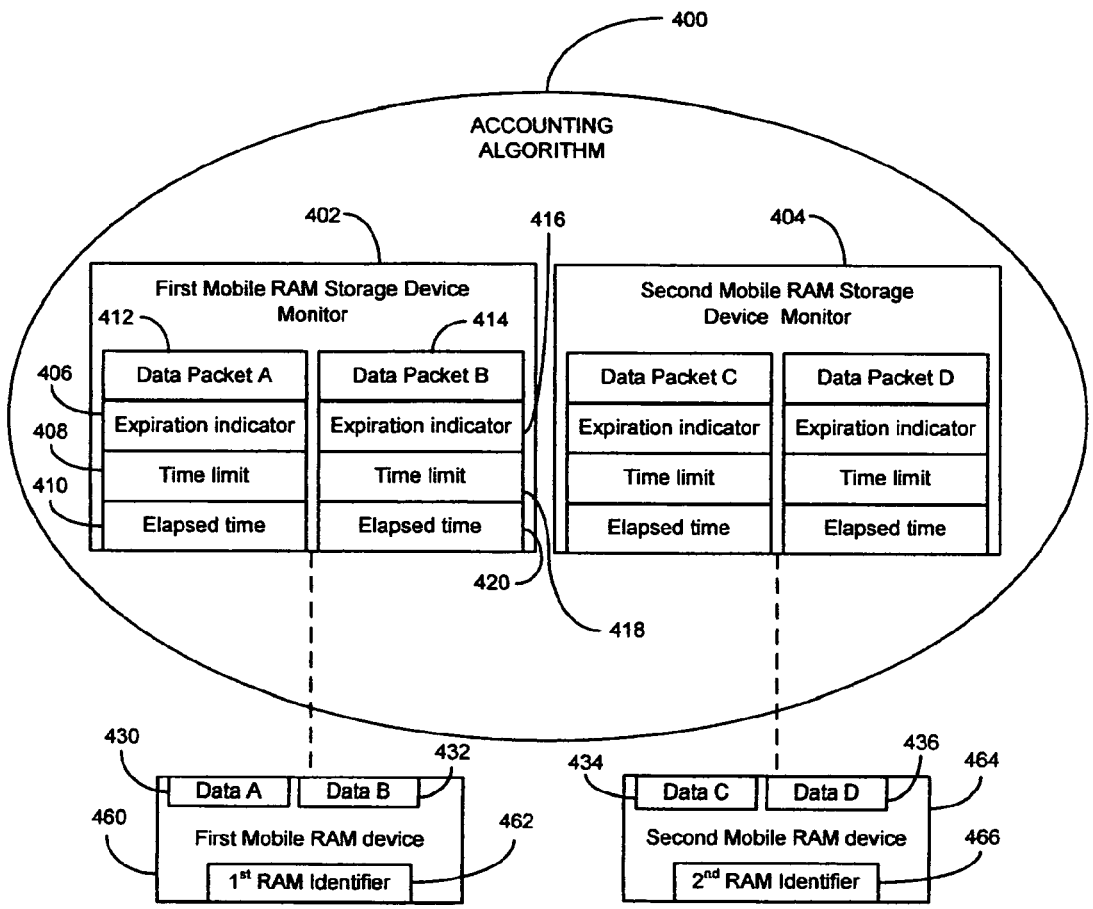
FIG. 4 shows an embodiment for a means for accounting for elapsed time from when data is stored on a mobile RAM storage device consistent with some embodiments of the present invention.

FIG. 4 shows an embodiment of a means for accounting for elapsed time from when data is stored on a mobile RAM storage device, such as the random access device 114 of FIG. 1 for example, consistent with some embodiments of the present invention. As illustratively shown, a first mobile RAM storage device 460 and a second mobile RAM storage device 464 are both being monitored for elapsed time from when data was stored on each respective mobile RAM storage device 460 and 464 by a time accounting algorithm 400. In one exemplary embodiment, the first mobile RAM storage device 460 may have received and stored data, such as a data packet A 430, from a host computer 102 and at a later time stored additional data, such as a data packet B 432. The time accounting algorithm 400 is implemented in the illustrative embodiment by a system comprising a first mobile RAM storage device monitor 402 that monitors data packet A 412 and more specifically, the time elapsed from when data packet A was stored 410, a time limit for when data packet A should be restored 408 (or stored again) based on the elapsed time, and capability to determine and indicate when the time limit for data packet A has been exceeded 406. The time limit for when data should be restored 408 can be set by a user, by an OEM, by a host computer, by the mobile RAM storage device 114, or by other consumers of data, to name several examples. In this embodiment, the accounting algorithm 400 can include an expiration indicator 406 prompt capable of alerting a user when data packet A 406 on the first mobile RAM storage device 460 should be restored. In an alternative embodiment, the expiration indicator can be part of the first mobile RAM device 460 or the storage library 106 of FIG. 1. The first mobile RAM storage device 460 comprises a first mobile RAM storage device identifier 462 which is an example of a means by which the accounting algorithm 400 can keep track of the first mobile RAM storage device 460 and/or a user can locate the first mobile RAM storage device 460 (such as if the first mobile RAM storage device 460 was archived in a remote location, for example). The first mobile RAM identifier 462 can be a bar code, RF device, number, label, symbol, code designation, sound transmitting device, light transmitting device or other suitable kind of identification transmitter, to name some examples. The time accounting algorithm 400 can be comprised and operated by a storage library, such as the storage library 106, a host computer, such as the host computer 102, the mobile RAM storage device, such as RAM device A 460, or by some other device, such as a personal digital assistant, for example.

The accounting algorithm 400 of FIG. 4 also illustrates capability for monitoring additional data packets and additional mobile RAM storage devices. For example, the first mobile RAM storage device monitor 402 is shown monitoring data packet B 414, wherein data packet B 432 is stored on the first mobile RAM storage device 460. More specifically, the data packet B monitor 414 keeps track of elapsed time from when the data for data packet B was stored 420, the time limit intended for when data packet B should be restored 418, and the capability to determine and indicate when data packet B has exceeded the time limit 416. The accounting algorithm 400 is also shown monitoring 404 a second mobile RAM device 464 comprising data packets C 434 and D 436, which includes a second RAM identifier 466 to help locate the second mobile RAM storage device 464. A skilled artisan will appreciate that the number of mobile RAM storage devices monitored by the accounting means, such as the accounting algorithm 400, is not limited to the first and second mobile RAM storage device 460 and 464, but rather can be selected as appropriate for a designed number of mobile RAM storage devices.

Figure 5A:
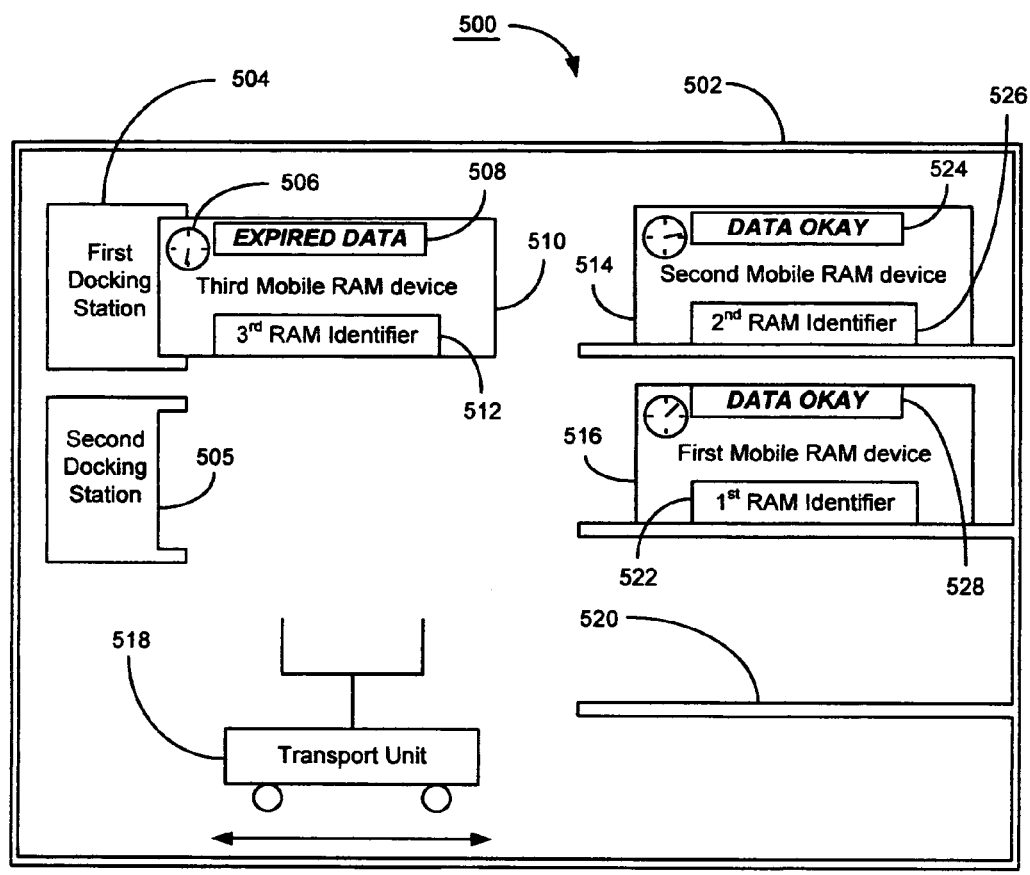
FIGS. 5A and 5B are block diagrams illustrating some embodiments of archiving mobile RAM storage devices consistent with some embodiments of the present invention.
Figure 5B:
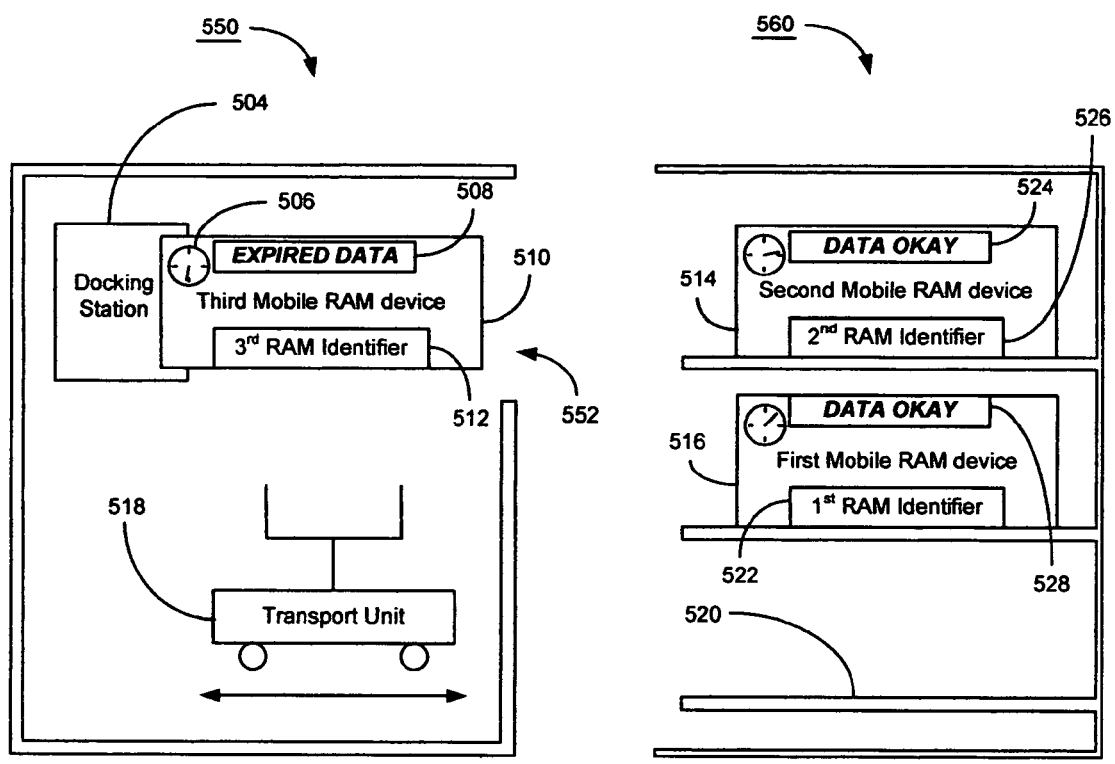

FIGS. 5A and 5B are block diagrams illustrating illustrative embodiments for archiving mobile RAM storage devices consistent with the present invention. FIG. 5A shows a data storage library 500 comprising a first, a second, and a third mobile RAM storage devices 516, 514 and 510, wherein the storage devices 514, 516 and 510 each comprise an identifier 522, 526 and 512 adapted to identify the respective mobile RAM storage devices 514, 516 and 510. In one embodiment, the RAM identifier, such as the third RAM identifier 512, can be a serial number stored as data in non volatile memory comprised by the mobile RAM device 510. The data storage library 500 further comprises a first docking station 504 and a second docking station 505 adapted to receive data from a host computer, such as the host computer 102 from FIG. 1, for storage on the mobile RAM storage devices 514, 516 and 510 when operatively linked with a mobile RAM storage device, such as when the third mobile RAM storage device 510 is operatively linked with the first docking station 504, as shown in this illustration. The mobile RAM storage devices 514, 516 and 510 each comprise a time monitor apparatus 506 (such as a clock or counter for example) adapted to monitor time elapsed from when the data received from the host computer 102 was stored on each of the mobile RAM storage devices 514, 516 and 510. In this embodiment, the mobile RAM storage devices 514, 516 and 510 each comprise an expiration indicator display 526, 528 and 508 respectively. The data storage library 500 also optionally comprises a shelving system 520 for archiving the mobile RAM storage devices 514, 516 and 510 wherein the shelving system 520 is substantially enclosed by an enclosure 502, in this example. The mobile RAM storage devices 514, 516 and 510 can be transported from an archive location 520 (illustratively shown as being associated with shelving system 520) to the first docking station 504 by means of a transport unit 518, such as a robotic device or picker. FIG. 5A shows the third mobile RAM device 510 operatively linked with the first docking station 504 to facilitate rewriting the expired data on the third mobile RAM device 510 in response to exceeding a time limit established for when the data should be restored as indicated by the expiration indicator 508. In one embodiment, the data from the third mobile RAM storage device 510 can be restored on itself 510. In an alternative embodiment, the data from the third mobile RAM device 510 can be stored on the second mobile RAM device 514, an alternative device, a tape medium or sent back to the host computer 102 for storage in another library, to name several options.

FIG. 5B shows an alternative embodiment of a data storage library 550 configured with similar components as described in FIG. 5A consistent with an embodiment of the present invention. The first and second mobile RAM storage devices 516 and 514 are archived in an external location 560 away from the data storage library 550. In this embodiment, the data storage library 550 is adapted to receive a mobile RAM storage device, such as the third device 510, through a pass-through port 552. In one example, a time limit from when data is stored on a mobile RAM storage device, such as the device 510, can be predetermined or preselected. For example, the time limit can be set to be less than the half way mark on the time monitor apparatus 506 (at the six o'clock position as shown herein). Upon reaching the time limit, the expiration indicator 506 will indicate that the data is expired and should be restored, as shown on the indicator 508 of the third mobile RAM storage device 510. The time limit can be reset to monitor when the data should be restored again as a consequence of restoring the data, such as if the data is restored on the same mobile RAM storage device on which the data was originally stored. In an alternative embodiment, a mobile RAM device, such as device 114, can store dates and times in the device 114 (such as in an E-PROM for example) for later comparison with a host 102 or the data storage library 106 to determine elapsed time.

Figure 6:
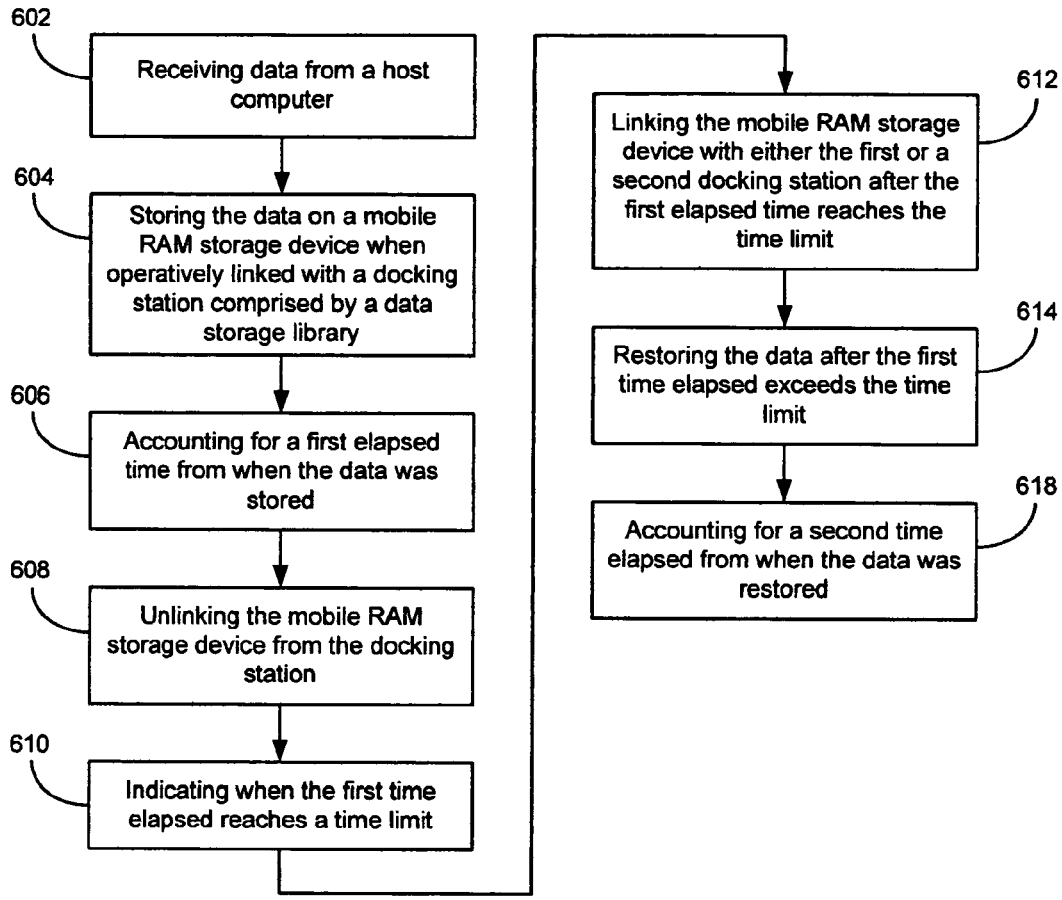
FIG. 6 shows a method to practice an embodiment of the present invention.

Referring now to FIG. 6, shown therein is a method to practice an embodiment of the present invention. It should be recognized that the steps presented in the described embodiments of the present invention do not require any particular sequence. Herein, generic elements from FIG. 1 are used for illustrative purposes. In step 602, data is received from a host computer, such as the host computer 102. Means for receiving data can be over a dedicated pathway or, in an alternative embodiment, a pathway over a network, wireless or wireline as previously disclosed, for example. A storage library, such as the data storage library 106, is capable of receiving data for storage from the host 102 typically via an interface adapted to facilitate communication between the data storage library 106 and the host computer 102. In step 604, data is stored on a mobile RAM storage device, such as the RAM device 114, when the mobile RAM device 114 is operatively linked with a docking station, such as the docking station A 108 for example. Means for storing the data on a mobile RAM storage device 114 can be accomplished with an operating system used by the docking station 108 or the data storage library 106, for example. In step 606, a first time elapsed from when the data was stored is accounted for. A means for accounting for elapsed time can be accomplished with an algorithm (such as the algorithm 400 of FIG. 4) or a timer that starts keeping track of time when the data is stored, or both, for example. The algorithm can be managed by a data storage library 106, host computer 102, a PDA or some other suitable device, to name a few examples. The point in time that the "clock starts" (from when time is kept track of) can be at the beginning of the data storage, the average point in time from when the first data is stored to when the last data is stored, or once the data has substantially finished being stored, to name several different options. An alternative means for accounting for elapsed time can be a self powered clock or counter disposed on a mobile RAM storage device 114 adapted to start keeping track of time from when the data is stored. As known by one skilled in the art, there are a variety of alternative means for accounting for elapsed time including combinations of time devices and algorithms. In step 608, the mobile RAM storage device 114 is unlinked from the docking station, such as docking station B 110. In the cased of the RXT disc drive magazine 201 and docking station 202 combination, the RXT disc drive magazine 201 can be pulled out of the docking station 202, thereby effectively disconnecting the units 201 and 202. Means for unlinking the mobile RAM storage device 114 from the docking station, such as docking station B 110, can be by physically disconnecting the two 114 and 110, turning off a signal transmission from 110 one to another 114, or any number of de-coupling means as is known by a skilled artisan. In step 610, indicating that the first time elapsed has reached a time limit from when the data was stored can function as an alert that the data on the mobile RAM storage device 114 should be restored. In one embodiment, all of the data on the mobile RAM storage device 114 can be restored if one data packet, such as data package A 430 of FIG. 4, comprised by the mobile RAM storage device 114 is expired. In an alternative embodiment, a specific expired data package, such as data packet A 430, can be restored. Means for indicating that the first time elapsed has reached a time limit can include a prompt on a computer screen from a mobile RAM storage device monitoring algorithm 400, an alarm comprised by the mobile RAM storage device 114 (such as an RF signal, a blinking light, sound emission, etc.) or a combination thereof, just to name several examples. In step 612, the mobile RAM storage device 114 is linked to a desired docking station, such as docking station A 108 or C 112 for example, after the first elapsed time reaches the time limit, and in one embodiment, in response to the indicating step 610. Means for linking the mobile RAM storage device 114 to the docking station, such as docking station A 108 can be by physically connecting the two 114 and 108, establishing a signal transmission from 108 one to another 114, or any number of coupling steps as is known by a skilled artisan. In the cased of the RXT disc drive magazine 201 and docking station 202 combination, the RXT disc drive magazine 201 can be inserted into the docking station 202, thereby effectively connecting the units 201 and 202. In step 614, the data is restored after the first time elapsed has exceeded the time limit. Means for restoring data can be automatic once the mobile RAM storage device 114 is linked to a docking station, such as docking station A 108, or alternatively, can require manual intervention or intervention from a host computer 102, for example. Restoring the data can be accomplished by transferring the expired data from the mobile RAM storage device 114 to a different device within the data storage library 106, to the host computer 102 which may then transfer the data to an alternative data storage system, to the same mobile RAM storage device 114 (which is considered a data refresh) or to a second mobile RAM storage device 114 comprised by the data storage library 106, just to name a few examples. Alternatively, the original data from which the expired data was constructed can be located and re-stored at a desired storage location. As shown in step 618, once the data has been rewritten, a second elapsed time is accounted for effectively "starting the clock over" on the newly rewritten data. The loop can begin again at step 608. It will be appreciated by one skilled in the art that the mobile RAM storage device 114 is not required to be unlinked as in step 608 and re-linked as in step 612. The mobile storage device 114 can remain in a linked state with the storage library 106 while the time elapsed reaches the expiration limit, for example.

Figure 7:
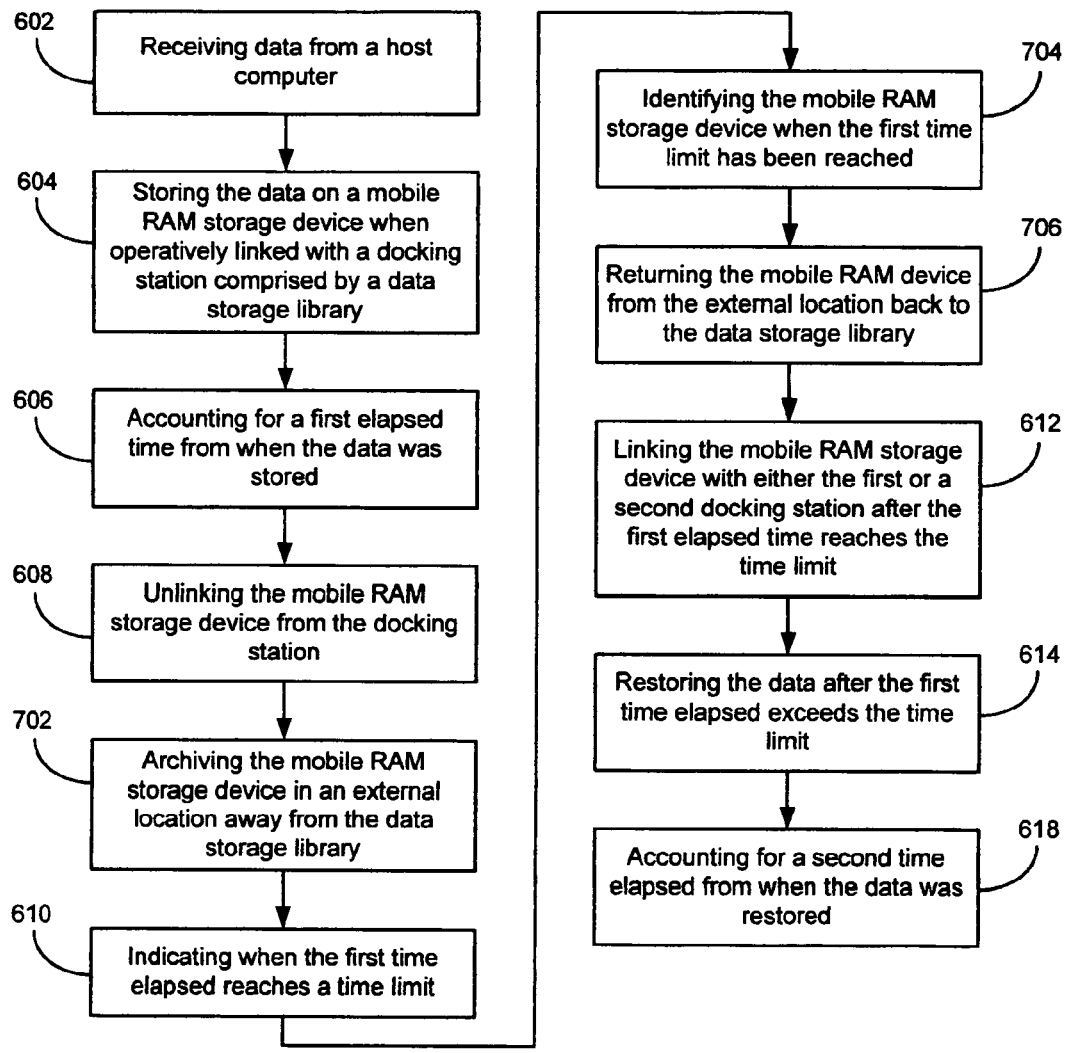
FIG. 7 is a method showing an alternative embodiment consistent with the present invention which includes method steps 602, 604, 606, 608, 610, 612, 614 and 618 described FIG. 6.

FIG. 7 is a method showing an alternative embodiment consistent with the present invention which includes method steps 602, 604, 606, 608, 610, 612, 614 and 618 from FIG. 6. Using similar elements from FIG. 5B for purposes of illustration, step 702 shows archiving a first 516 and second 514 mobile RAM storage device in an external location 560 away from the data storage library 550. Means for archiving a mobile RAM storage device, such as the second mobile RAM device 514, can be accomplished by a person disposing the second mobile RAM device 514 on a shelf 520 comprised by an external shelf system 560. An alternative means for archiving can be a robotic transport system capable of disposing the second mobile RAM device 514 in an external location, such as the shelf system 560. In step 704, the second mobile RAM storage device 514 is identified when the first time limit has been reached. Means for identifying the second mobile RAM storage device 514 can be accomplished by a bar code, just to name one embodiment as previously disclosed. An identification means may be important for locating a mobile RAM storage device 514 from amidst a plurality of other mobile RAM devices for example. As shown in step 706, a mobile RAM device, such as the third mobile RAM device 510, is returned back to the data storage library 550 from the external location 560. Means for returning a mobile RAM device, such as the third device 510, can be accomplished by a person or robotic system moving the mobile RAM device 510 to the data storage library 550, just to name two examples.

Figure 8:
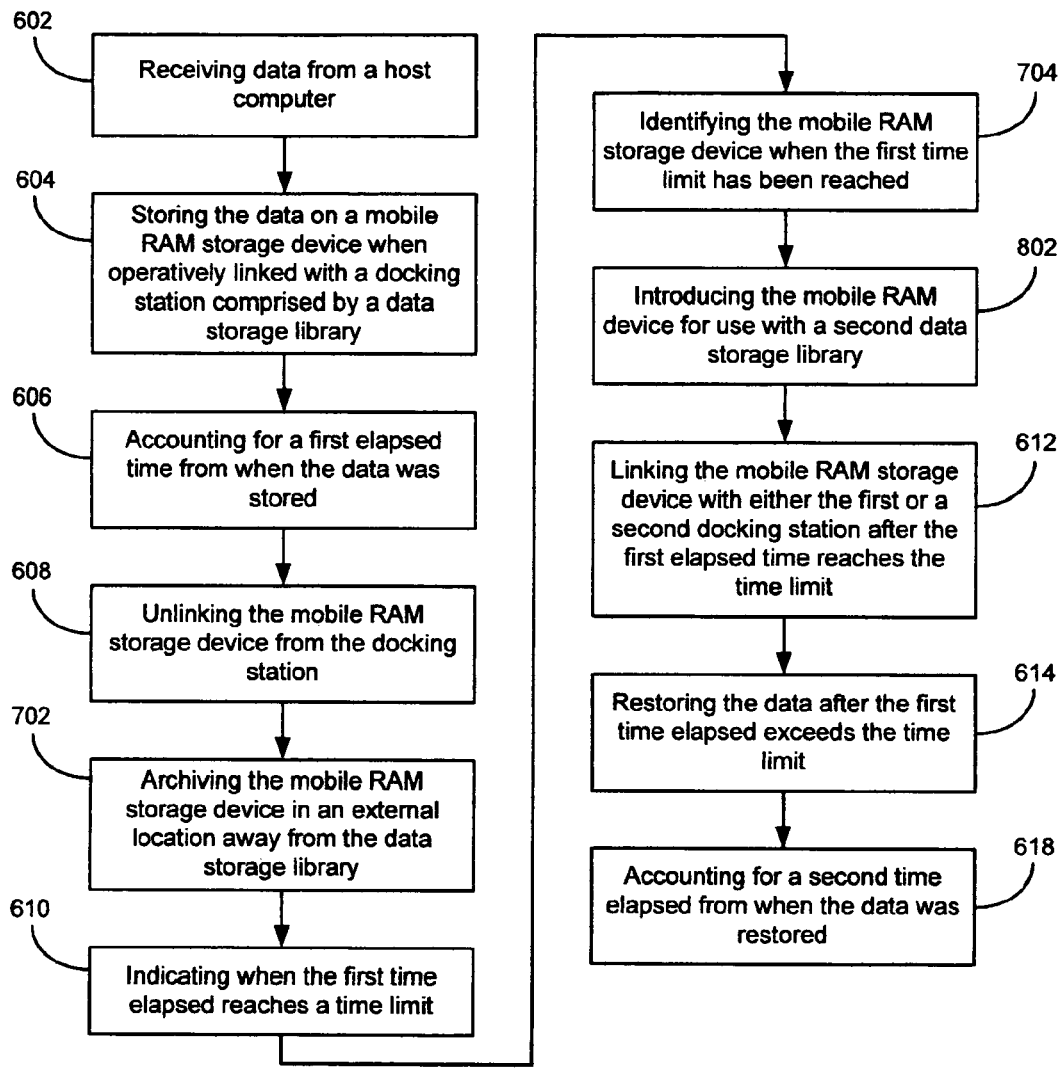
FIG. 8 is a method showing an alternative embodiment consistent with the present invention which includes method steps 602, 604, 606, 608, 610, 612, 614 and 618 described in FIG. 6 and steps 702 and 704 described in FIG. 7.

FIG. 8 is a method showing an alternative embodiment consistent with the present invention which includes method steps 602, 604, 606, 608, 610, 612, 614 and 618 described in FIG. 6 and steps 702 and 704 described in FIG. 7. Using similar elements from FIG. 5B for purposes of illustration, in step 802 a mobile RAM device, such as the third mobile RAM device 510, is introduced to a second data storage library, which may be similar to the data storage library 550 adapted to receive the mobile RAM storage device 510, from the external location 560. Means for introducing a mobile RAM device, such as the third device 510, can be accomplished by a person or robotic system moving the mobile RAM device 510 to the data storage library 550, just to name two examples. The use of a second data storage library may be advantageous in the event a first data storage library is inaccessible or sub-optimally located relative to the mobile RAM device 510, for example.

Figure 9:
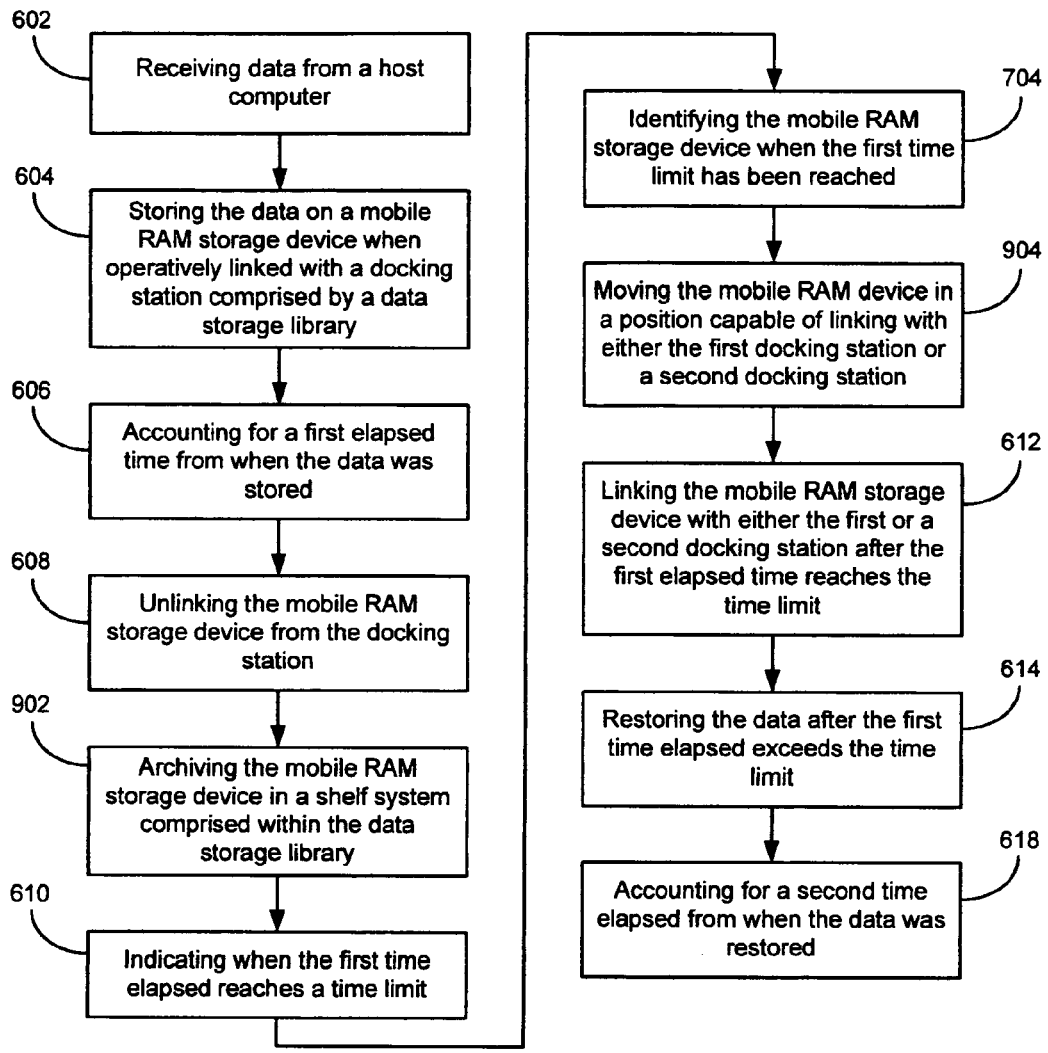
FIG. 9 is a method showing an alternative embodiment consistent with the present invention which includes method steps 602, 604, 606, 608, 610, 612, 614 and 618 described in FIG. 6 and step 704 described in FIG. 7.

FIG. 9 is a method showing an alternative embodiment consistent with the present invention which includes method steps 602, 604, 606, 608, 610, 612, 614 and 618 described in FIG. 6 and step 704 described in FIG. 7. Using similar elements from FIG. 5A for purposes of illustration, in step 902 a mobile RAM storage device, such as the first 516 or second 514 mobile RAM storage devices, is archived in a shelf system comprised substantially within the data storage library 500. Herein, a shelf system 520 supports the mobile RAM storage devices. The shelf system 520 can be a shelf or slot for example. A means for archiving a mobile RAM storage device, such as the second RAM device 514, can be accomplished with a transport unit 518 adapted to move the mobile RAM storage device 514 around the data storage library 500. In step 904, a mobile RAM storage device, such as the RAM device 510, is moved from the archive location 520 to either a first 504 or second 505 docking station within the data storage library 500.

Embodiments of the present invention can be commercially practiced, for example, with an RXT storage system 200 of FIG. 2, performing as a data storage library 106, for use with RXT disc drive magazines 201. The RXT storage system 200 can comprise one or more RXT docking stations 202 adapted to cooperate with an RXT disc drive magazine 201. As previously described, an RXT disc drive magazine 201 encases a plurality of disc drives, such as 308, commercially available from, for example, from Seagate Corporation of Scotts Valley, Calif. Because a disc drive 308 is subject to data loss, due in part to thermal instabilities in the magnetics of the discs 312, restoring the data before substantial data loss can occur may be a critical ingredient to preserve data over an extended period of time. Though the time elapsed before data loss reaches a critical level from when data is first stored on a disc drive 312 is different for different disc drive products and disc drive generations, for illustrative purposes, an illustrative critical time for restoring saved data may be six months. In this example, the RXT Bank of drives 200 is adapted to receive data packages from a host computer, such as a network host. The data is stored on a first RXT disc drive magazine 201 when operatively linked with an RXT docking station 202. The RXT storage system 200 comprises a time accounting algorithm, written and stored at the OEM level for monitoring the amount of time elapsed from when each data package was stored on the first RXT disc drive magazine 201. The algorithm is capable of having a desired time limit set manually, in this case six months, and is further capable indicating when the six month time limit has been reached for when any given data packet was stored. When the first RXT disc drive magazine 201 has reached maximum storage capacity, the first RXT disc drive magazine 201 is unlinked (removed) from the RXT docking station 202 and disposed in an external archive local, called a vault. The time accounting algorithm is adapted to prompt a user with an alert message appearing on an LCD screen disposed on the T950 library when any of the data packets stored on the first RXT disc drive magazine 201 has reached the time limit set for six months. Upon receiving the prompt that the first RXT disc drive magazine 201 has data that is expired and should be restored, an operator is instructed to locate the first RXT disc drive magazine 201 in the vault and return the first RXT disc drive magazine 201 back to the RXT storage system 200. A bar code 212 is displayed on the first RXT disc drive magazine 201 for identification purposes to help locate the first RXT disc drive magazine 201. When the first RXT disc drive magazine 201 containing expired data is re-linked with the T950, the accounting algorithm will initiate restoring of the expired data in the first RXT disc drive magazine 201. When the data has been refreshed, the time accounting algorithm is adapted to monitor the elapsed time of the refreshed data in the first RXT disc drive magazine 201, which is free to be re-archived.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the pringples of the present invention to the full extent indicated by the broad general meaning of the terms in which the appended claims are expressed. For example, numerous time accounting techniques can be used to monitor elapsed time from when data is stored on a mobile RAM storage device, such as the mobile RAM storage device 114 of FIG. 1, while still maintaining substantially the same functionality without departing from the scope and spirit of the present invention. Another example can include setting a time limit which can vary depending on the type of mobile RAM storage device, a time limit can be set by a person or a prediction algorithm capable of analyzing the data decay of a mobile RAM storage device, just to name a few examples while still maintaining substantially the same functionality without departing from the scope and spirit of the present invention. Further, though communication is described herein as between the host computer 502 and the docking station 408 communication can be received by the storage system 400 and channeled to the docking station 408 without departing from the scope and spirit of the present invention. Finally, although the preferred embodiments described herein are directed to disc drive systems, such as the disc drive magazine 201, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method for preserving data integrity comprising: receiving data from a host computer; storing the data on a mobile random access storage device when the mobile random access storage device is operatively linked with a first docking station wherein a first data storage library comprises the first docking station; accounting for a first elapsed time from when the data was stored wherein the first elapsed time is displayed on a time monitor apparatus disposed on the mobile random access memory storage device; unlinking and removing power to the mobile random access storage device from the first docking station; indicating when the first elapsed time reaches a time limit; linking the mobile random access storage device with either the first or a second docking station after the first elapsed time reaches the time limit; restoring the data after the first elapsed time exceeds the time limit; and accounting for a second elapsed time from when the data was restored, wherein the accounting step is accomplished automatically using an accounting algorithm accounting the first or second elapsed time for individual packets of data stored for each of a plurality of mobile random access storage devices wherein each of the plurality of mobile random access storage devices are identifiable.

2. The method of claim 1 further comprising: archiving the mobile random access storage device in an external location away from the first data storage library after the unlinking step; identifying the mobile random access storage device when the first time limit has been reached; returning the mobile random access storage device from the external location to the first data storage library.

3. The method of claim 1 further comprising: archiving the mobile random access storage device in an external location away from the first data storage library after the unlinking step; identifying the mobile random access storage device when the first time limit has been reached; introducing the mobile random access storage device for use with a second data storage library.

4. The method of claim 1 further comprising: archiving the unlinked mobile random access storage device in a shelf system comprised within the first data storage library; identifying the mobile random access storage device when the first time limit has been reached; moving the mobile random access storage device in a position capable of linking with the first docking station or a second docking station.

5. The method of claim 1 further comprising identifying the mobile random access storage device when the first time limit has been reached wherein the identifying step is accomplished with an identifier associated with the mobile random access storage device.

6. The method of claim 1 wherein the restoring the data is performed on the mobile random access storage device.

7. A data storage library comprising: at least one mobile random access storage device comprising an identifier that identifies the mobile random access storage device in a remote location; at least one docking station that receives data from a host computer for storage on the at least one mobile random access storage device when operatively linked with the at least one mobile random access storage device; a time monitor apparatus disposed on the mobile random access memory storage device wherein the time monitor apparatus possesses a time accounting algorithm implemented on a programmable processor that monitors elapsed time from when the data was stored on the at least one mobile random access storage device and wherein the time accounting algorithm indicates when the elapsed time has exceeded a time limit from when the data was stored, wherein the elapsed time is monitored independent of power being provided to the at least one mobile random access storage device; wherein the data is rewritten on the at least one mobile random access storage device in response to the time accounting algorithm indicating that the data has exceeded the time limit and the data should be restored; wherein the time accounting algorithm automatically accounts for the elapsed time for individual packets of data stored for each of the mobile random access storage devices.

8. The data storage library of claim 7 wherein the data is rewritten on a different mobile random access storage device in response to the time accounting algorithm indicating that the data has exceeded the time limit and the data should be restored.

9. The data storage library of claim 7 wherein the data is rewritten on a different storage device located in a different data storage library in response to the time accounting algorithm indicating that the data has exceeded the time limit and the data should be restored.

10. The data storage library of claim 7 wherein the at least one mobile random access storage device is selected from the group consisting of: flash memory device, magnetic disc drive, disc drive magazine, optical media drive, magneto-optical drive and floppy disc drive.

11. The data storage library of claim 7 wherein the identifier is used to identify the at least one mobile random access storage device when archived in an archive location.

12. The data storage library of claim 11 wherein the archive location is external to the data storage library.

13. The data storage library of claim 7 wherein the identifier is selected from the group consisting of at least a: bar code, RF device, number, label, symbol, code designation, sound transmitting device and a light transmitting device.

14. A system for preserving data integrity comprising: means for receiving data from a host computer; means for storing the data on a mobile random access storage device when the mobile random access storage device is operatively linked with a first docking station wherein a first data storage library comprises the first docking station; means for accounting for first elapsed time from when the data was stored; means for unlinking the mobile random access storage device from the docking station; means for indicating when the first elapsed time reaches a time limit; means for displaying the first elapsed time on the mobile random access storage device independent of power supplied to the mobile random access storage device; means for linking the mobile random access storage device with either the first or a second docking station after the first elapsed time reaches the time limit; means for restoring the data after the first elapsed time exceeds the time limit; means for accounting for second elapsed time from when the data was restored; and wherein the accounting is accomplished automatically using an accounting algorithm that accounts the first or second elapsed time for individual packets of data stored for the mobile random access storage device wherein the mobile random access storage device is identifiable.

15. The system for preserving data integrity of claim 14 further comprising: means for archiving the mobile random access storage device in an external location away from the first data storage library after the unlinking step; means for identifying the mobile random access storage device when the first time limit has been reached; means for returning the mobile random access storage device from the external location to the data storage library.

16. The system for preserving data integrity of claim 15 wherein the means for identifying the mobile random access storage device is accomplished with an identifier associated with the mobile random access storage device when in the unlinked state.

17. The system for preserving data integrity of claim 14 further comprising: means for moving the unlinked mobile random access storage device to a shelf system; means for archiving the unlinked mobile random access storage device in a shelf system comprised within the data storage library; means for identifying the mobile random access storage device when the time limit has been reached; means for moving the mobile random access storage device in a position capable of linking with the first or second docking station.

18. The system for preserving data integrity of claim 14 wherein the means for restoring the data is accomplished by rewriting the data on the mobile random access storage device.

19. A data storage device performing the method steps of: storing data on a mobile random access storage device when the mobile random access storage device is operatively linked with a docking station; accounting for elapsed time from when the data was stored; displaying the elapsed time on the mobile random access storage device independent of power supplied to the mobile random access storage device; unlinking the mobile random access storage device from the docking station; relocating the mobile random storage device after the unlinking step; linking the mobile random access storage device with either the docking station or a different compatible docking station after the elapsed time exceeds a time limit after the relocating step; restoring the data after the elapsed time exceeds a time limit; wherein the accounting is accomplished automatically using an accounting algorithm that accounts the elapsed time for individual packets of data stored for the mobile random access storage device wherein the mobile random access storage device is identifiable.

20. The data storage device of claim 19, wherein the data storage device performs the method step of accounting for a second elapsed time from when the data was restored and restoring the restored data after the second elapsed time exceeds the time limit.

21. The data storage device of claim 19, wherein the data storage device performs the method step of unlinking the mobile random access storage device from the docking station; linking the mobile random access storage device with either the first or a second docking station after the elapsed time reaches the time limit.

22. The data storage device of claim 19, wherein the data storage device performs the method step of indicating when the elapsed time reaches the time limit.

23. The data storage device of claim 19, wherein the data storage device is a magazine comprising a plurality of disc drives.

24. The data storage device of claim 19, wherein the data storage device is comprised of a data storage library further comprising at least another docking station capable of transferring second data for storage to another mobile random access storage device.

25. The data storage device of claim 24, wherein the data storage library performs the method step of transferring the second data while performing the storing step.

* * * * *